(12) United States Patent
Giesler et al.

(10) Patent No.: US 6,505,974 B2
(45) Date of Patent: Jan. 14, 2003

(54) CERAMIC BALL BEARINGS AND ASSEMBLY

(75) Inventors: William Giesler, Phoenix, AZ (US); James Guiheen, Madison, NJ (US); Robert Feest, Fountain Hills, AZ (US); Charles Gasdaska, Sparta, NJ (US); Steven Sund, Ogdensburg, NJ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/847,691

(22) Filed: May 2, 2001

(65) Prior Publication Data

US 2002/0164100 A1 Nov. 7, 2002

(51) Int. Cl.$^7$ ............................................... F16C 33/62
(52) U.S. Cl. ..................... 384/565; 384/569; 384/907.1
(58) Field of Search ............................... 384/565, 569, 384/571, 907.1, 492

(56) References Cited

U.S. PATENT DOCUMENTS

| | | |
|---|---|---|
| 3,212,834 A | 10/1965 | Mayer et al. |
| 3,653,732 A | 4/1972 | Fairbank |
| 4,311,937 A | 1/1982 | Clark .......................... 310/268 |
| 4,329,000 A | 5/1982 | Keske .......................... 308/187 |
| 4,410,285 A | 10/1983 | Strasser et al. ............. 384/278 |
| 4,516,915 A | 5/1985 | Jensen et al. ............... 417/365 |
| 4,547,083 A | 10/1985 | Horler ......................... 384/535 |
| 4,611,933 A | 9/1986 | Hofmann et al. ........... 384/512 |
| 4,671,680 A | 6/1987 | Hauser et al. ............... 384/428 |
| 4,754,181 A | 6/1988 | Mizobuchi et al. ......... 310/104 |
| 4,770,549 A | 9/1988 | Rokkaku et al. ............ 384/492 |
| 4,792,244 A | 12/1988 | Yamashita et al. .......... 384/492 |
| 4,806,080 A | 2/1989 | Mizobuchi et al. ......... 417/353 |
| 4,808,014 A | 2/1989 | Ueda et al. .................. 384/492 |
| 4,997,296 A | 3/1991 | Narita et al. ................ 384/492 |
| 5,017,022 A | 5/1991 | Ruggles et al. ............. 384/100 |
| 5,052,828 A | 10/1991 | Ciokajlo et al. ............ 384/476 |
| 5,054,940 A | 10/1991 | Momose et al. ............ 384/193 |
| 5,083,873 A | 1/1992 | Momose et al. ............ 384/280 |
| 5,094,550 A | 3/1992 | Momose et al. ............ 384/420 |
| 5,102,239 A | 4/1992 | Momose et al. ............ 384/276 |
| 5,112,146 A | 5/1992 | Stangeland ................. 384/492 |
| 5,127,745 A | 7/1992 | Momose et al. ............ 384/276 |
| 5,135,314 A | 8/1992 | Momose et al. ............ 384/275 |
| 5,136,789 A | 8/1992 | Burton ......................... 33/558 |
| 5,215,386 A | 6/1993 | O'Dwyer .................... 384/537 |
| 5,380,112 A | 1/1995 | Schicktanz et al. .......... 403/28 |
| 5,508,241 A | 4/1996 | Yeckley ....................... 501/97 |
| 5,593,234 A | 1/1997 | Liston ......................... 384/492 |
| 5,599,109 A | 2/1997 | Negwer ...................... 384/308 |
| 5,639,165 A | 6/1997 | Aizawa et al. .............. 384/315 |
| 5,730,928 A | 3/1998 | Ghosh et al. ................ 264/629 |
| 5,795,138 A | 8/1998 | Gozdawa .................... 417/243 |
| 5,800,068 A | 9/1998 | Wanger ....................... 384/119 |
| 5,971,620 A | 10/1999 | Gabelli et al. .............. 384/491 |

Primary Examiner—Lenard A. Footland
(74) Attorney, Agent, or Firm—Keith A. Newburry, Esq.

(57) ABSTRACT

A ceramic ball bearing assembly (20) has raceway components generally held in residual compression by accompanying metal attachments. In a ceramic ball bearing assembly (20), an outer raceway (22) is formed that is held in compression by a circumscribing steel ring. The components may be fitted together with the ceramic raceway subject to thermal contraction while the steel ring is subject to thermal expansion. Upon mating, the ceramic raceway (22) slightly expands while the steel ring slightly contracts to impose residual compression upon the ceramic raceway. The residual compression preserves the ceramic raceway despite thermal or other stresses of operating environment. An inner ceramic raceway (24) is constructed by employing one of several of the herein described methods, and the ceramic ball bearing assembly of the present invention may use balls (26), needles, cylinders, or other rolling elements in order to achieve smooth angular translation between the inner and outer ceramic raceways.

5 Claims, 6 Drawing Sheets

CERAMIC BALL BEARINGS AND ASSEMBLY

TECHNICAL FIELD

This invention relates to ball bearings and the like for use in mechanical structures including aircraft, and more particularly to a ceramic ball bearing assembly that provides ceramic-on-ceramic operation.

BACKGROUND ART

Current manufacturing practices used in the manufacture of ball bearings result in difficulties associated with allowing 100% of the contact surfaces to be ceramic material. This limitation is driven by the difficulty to mount low tensile strength, high Young's modulus, low thermal expansion rate ceramic rings on to steel shafting as the corresponding characteristics of the steel shafting are incompatible with those of ceramic rings. Ceramic rings are sensitive to tensile stresses which can result in destructive overload failure. For high DN applications and for application across large temperature regimes, the current state of the art is to use ceramic balls with steel raceway rings. Ceramic balls have lower adhesive tendencies than all-steel balls and high hot hardness. The achievement of a robust all-ceramic bearing would result in an operating advantage over partially, or hybrid, ceramic bearings in high-speed, high temperature low lubrication, and/or hot environments.

Consequently, it would be of some advantage to provide a robust means by which 100% of the contact surfaces in a ball bearing or the like could be ceramic. As indicated above, mounting ceramic rings directly on steel shafting tend to destroy the ceramic rings due to operating incompatibilities. Consequently, it would be an advance in the art to provide ceramic ball bearings and assemblies thereof that were compatible with steel drive shafts, other steel shafts, and the like.

DISCLOSURE OF INVENTION

The present invention provides low-cost ceramic ring/steel ring assemblies that can be achieved through the application of braze technology, creating residual compressive loading of the ceramic ring with the high load capacity steel. A steel ring circumscribing the outer diameter of a ceramic outer raceway will shrink more while cooling down from braze temperature than the ceramic ring in the assembly. This results in residual compression in the steel-rim hoop structure in both hoop and axial directions in the ceramic ring. Ceramics are generally materials that withstand compression well but may suffer destructively if subject to tension or tensile forces. Consequently, by using the steel ring's material characteristics to create residual compression upon the ceramic ring, the ceramic ring can be protected from destructive tensile forces.

For an inner ceramic ring or raceway, a steel ring on the inside of a ceramic inner raceway shrinks more during cool down from braze temperature than the circumscribing ceramic ring. Therefore suitable means are required for managing, the residual compression in both hoop and axial directions in the ceramic ring.

Residual compressive stress, when properly managed, can serve to protect the weak-in-tension but strong-in-compression ceramic rings from cracking during operation, as well as during a press-fit mounting of the ceramic bearing assembly. A bearing which properly manages the ceramic residual stresses enables a ceramic ball bearing with 100% of the contact surfaces being ceramic materials to be achieved as opposed to the current state-of-the-art hybrid system with a ceramic ball and steel races. Braze technology set forth herein also enables the use of segmented ceramic ring segments if required due to dissimilar thermal expansion, centrifugal loading, or other operating characteristics.

In an alternative embodiment of the present invention, an inverse hybrid configuration may be achieved where a steel ball bearing runs against the ceramic raceway. The technical advantage to this embodiment is that a difficult-to-machine steel material can be used for the rolling ball using existing mass production techniques which reduce the cost for such steel balls. In conjunction with ceramic raceways, the ceramic tribological (low-wear, low-lubrication requirements) contact advantages are maintained by the ceramic rings. The contact stresses are reduced by the use of steel balls having a low Young's modulus. Such steel balls may be made of GB42, Cobalt alloys, or be hollow.

In a third alternative embodiment, AES (Aircraft Engine System) high temperature unlubricated valve bearings may be achieved. Low-cost, high-temperature ceramic ring/steel ring assemblies can be achieved through the application of high-temperature braze technology to create residual compressive loading of the ceramic ring coupled with a high load capacity steel outer or inner ring. This enables a true ceramic ball bearing as opposed to current state-of-the-art ceramic hybrid bearings with ceramic balls turning in steel races. Such ceramic ball bearings set forth herein offer increased wear and erosion resistance, which is a significant problem in the field. Such ceramic ball bearings have the potential to be significantly advantageous for AES high temperature valves.

Other features and advantages of the present invention will become apparent from the following description of the preferred embodiment(s), taken in conjunction with the accompanying drawings, which illustrate, by way of example, the principles of the invention.

MODE(S) FOR CARRYING OUT THE INVENTION

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The present invention achieves bearings having 100% of the contact surfaces being ceramic material. Such bearings have significant advantages over regular steel or "hybrid" ceramic-and-steel bearings for high-speed, high temperature, low lubrication and/or hot environments.

One of the significant problems with respect to creating a robust ceramic bearing capable of operating over wide temperature and DN regimes is to manage tensile forces developed during the operating of the ceramic bearing so that the forces do not destroy the bearing. As set forth in more detail below with respect to construction and operation of the ceramic ball bearings and assembly of the present invention, the problem of tension upon the ceramic raceways has been resolved by delivering a protective carriage or chassis in the form of a steel raceway in a variety of different geometries. Even though operating conditions may cause thermal or other expansion of the assembly, the configurations set forth allow for management of the tensile pressures or forces which result from such expansions, thus preserving the integrity of the ceramic raceway and creating greater reliability and less risk of destruction of the ceramic raceway. Tensile pressures may also occur due to expansion of adjoining parts, such as a steel shaft press fitted through the steel mounting rings. The present invention also takes such adjoining part expansion into account in order to preserve and maintain the ceramic raceways (the residual compressive stress in the ceramic prevents the ceramic ring from being placed in tension).

Figure 1:
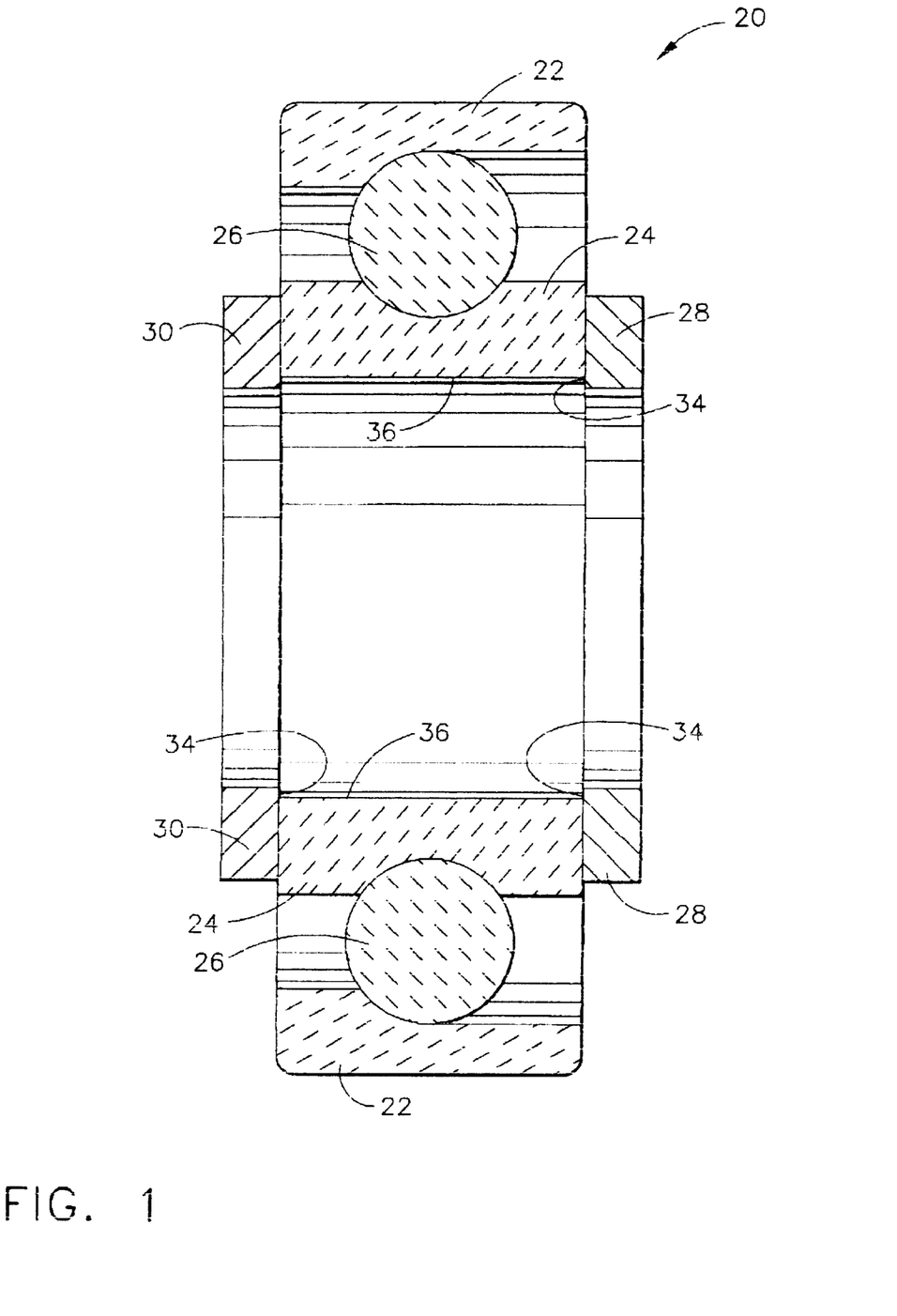
FIG. 1 is a side cross-sectional view of a ceramic ball bearing assembly of the present invention.

Turning now to FIG. 1, one embodiment of the present invention is shown. The ceramic ball bearing assembly 20 of FIG. 1 has an outer raceway 22, an inner raceway 24, one or more ceramic ball bearings or other rolling elements 26, and oppositely-opposed, laterally-adjacent steel rings 28, 30.

Absent from FIG. 1 is an outer steel ring or the like. Generally, the construction of an outer ceramic raceway for a ceramic ball bearing is achieved by shrink fit techniques such that positive interference is maintained throughout the entirety to predicted operating range, and such that the stresses generated from such an interference fit do not cause catastrophic residual stresses in the ceramic or yielding in the metal.

Alternately, another suitable mechanical of chemical bonding technique can be used to attach an outer steel ring to the outer ceramic ring 22.

With respect to the construction of the inner raceway as shown in FIG. 1, the fabrication process is as follows: A ceramic inner raceway 24 is bonded to a complement of laterally facing washers 30, 28 by means of a suitable brazement 34. The brazement consist of an series of layers which allow for chemical bonding and for residual stress management. Such brazement may be according to U.S. patent application Ser. No. 09/782,865 filed Feb. 13, 2001 and/or U.S. Pat. No. 6,131,797 issued Oct. 17, 2000 to Gasdaska et al. entitled "Method for joining ceramic to metal which are incorporated herein by this reference thereto. The '865 patent application discloses brazing with molybdenum rings as well as molybdenum and nickel rings. The '667 patent discloses brazing using molybdenum for joining ceramic to metal.

To accomplish the chemical bond, and the stress management, The attachment between the steel rings 28, 30 and the inner ceramic raceway ring 24 incorporates a braze joint-interlayer system,. Such an interlayer system may include the use of alternative layers of braze-molybdenum-braze as well as braze—nickel—braze—molybdenum—braze and has been shown capable of accommodating the stresses with acceptable reliability. In some embodiments, the interlayer system may or may not use a nickel layer. Care must be taken during the construction process to maintain detail alignment. In fabricating the ceramic ball bearing assembly 20 of FIG. 1, the tolerances need not be precise to a high degree as post-braze machining can be used to achieve the final dimensions. During service, when the bearing assembly 20 is put to use, the thermal expansion of a shaft passing through the center aperture 32 of the bearing assembly 20 causes a change in the stress state in the inner race assembly, however, due to design of the ceramic-metal interface 34, and the overall component design, the stress state in both the metal and the ceramic remains acceptable.

Figure 2:
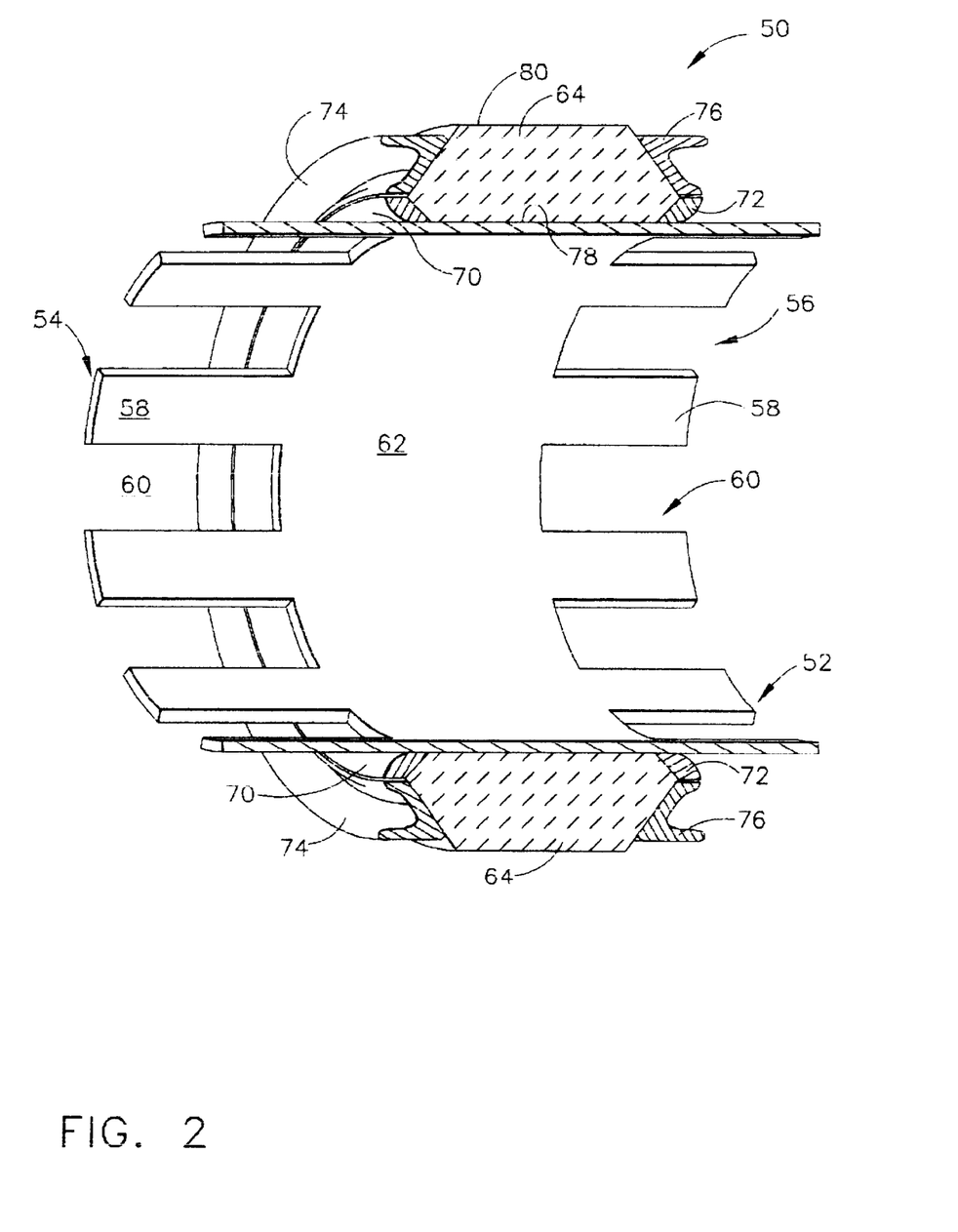
FIG. 2 is a side cross-sectional and partially perspective view of an embodiment of the present invention using a castellated steel sleeve.
Figure 3:
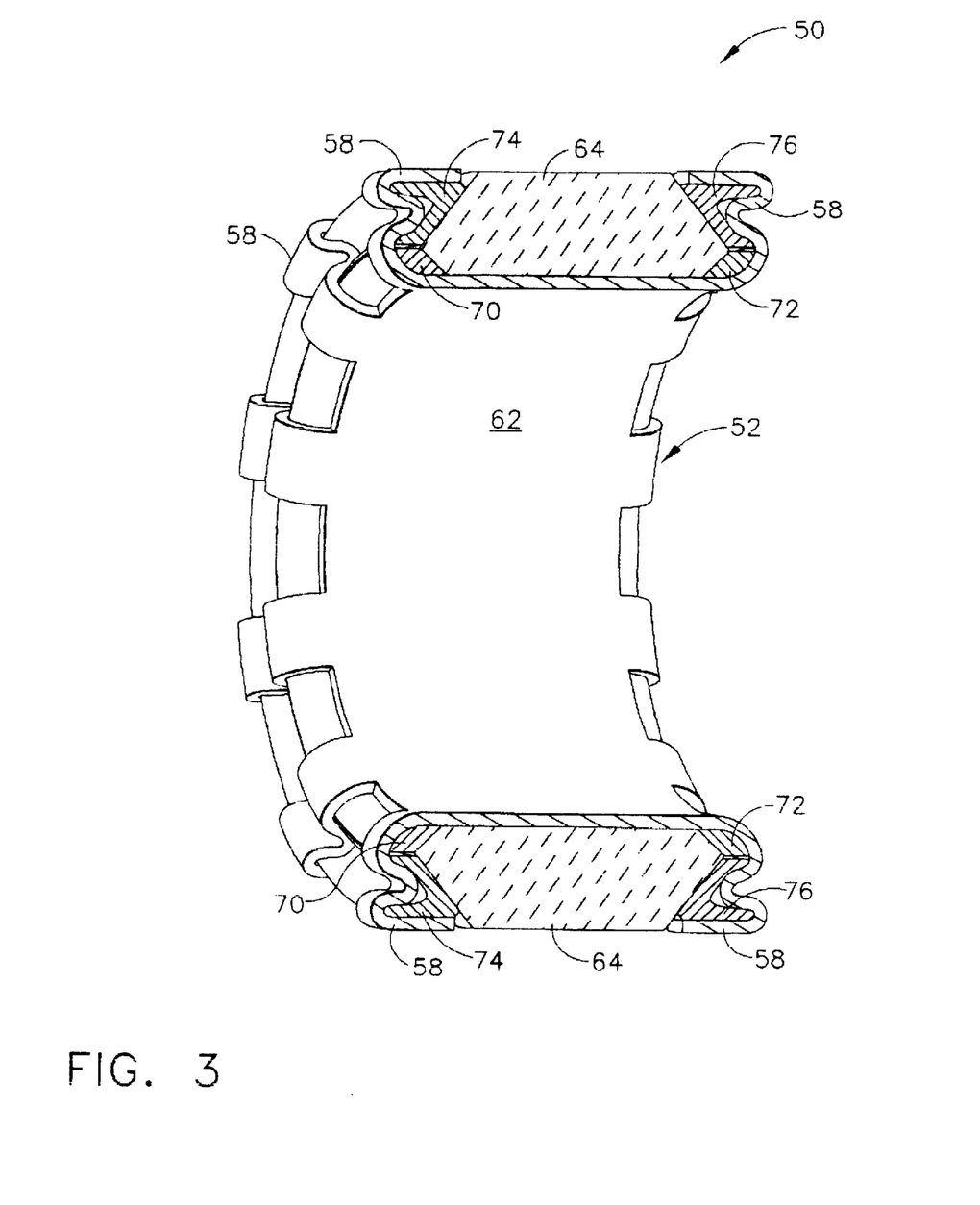
FIG. 3 shows a side cross-sectional and partially perspective view of the ceramic ball bearing assembly shown in FIG. 2 with the castellated projections wrapped to engage the ceramic ring.

Note should be taken that the steel rings 28, 30 have a smaller inner diameter than the inner ceramic raceway ring 24. This causes the steel rings 28, 30 to enjoy a certain thrust or extension 34 past the inner surface 36 of the inner ceramic raceway 24. This enables the steel rings 28, 30 to engage a drive shaft or the like passing through the center aperture 32 of the bearing assembly 20. When the shaft (not shown) expands, it is the steel rings 28, 30 that bear the brunt of such expansion. In FIGS. 2 and 3, an alternative embodiment of the present invention is shown using a castellated steel tube having projecting parapets that are used to engage an inner ceramic raceway surrounded by wedges which allow some spatial accommodation for the entrapped inner ceramic raceway ring.

As shown in FIG. 2, the inner raceway assembly 50 has an inner steel tube 52 which is castellated in that it has oppositely opposed parapets 54, 56, each parapet having alternating merlons 58 and crenels 60.

The center area 62 of the inner steel tube 52 is generally solid in nature in order to support the inner ceramic raceway 64. As shown in FIG. 2, the inner ceramic raceway 64 has the form of a biased hexagon in cross section with the outer portion of the hexagon predominating over the inner portion. A lower pair of wedge rings 70, 72 engage the inner ceramic ring 64 on opposite sides of the ceramic ring 64. A pair of upper wedge rings 74, 76 engage opposed outer hexagon sides of the inner ceramic ring 64. The lower hexagon surface 78 engages the center portion 62 of the o inner steel tube 52, while the upper hexagon surface 80 serves as a platform or raceway for the rolling elements such as balls, needles, cylinders or other rollers, or the like.

The upper and lower wedges 70, 72, 74, 76 may be ring or ring-like in nature or they may be constructed in alternative embodiments to correspond to the merlons 58 of the parapets 54, 56.

As shown in FIG. 3, the wedges 70, 72, 74, 76 may be engaged by corresponding merlons 58 that are folded or bent to engage the wedges 70, 72, 74, 76. This allows the ceramic ring 64 to be entrapped by the wedges 70, 72, 74, 76 which are themselves held in place by the in-folded or in-bent merlons 58.

As shown in FIGS. 2 and 3, the wedges generally take a shape that accommodates both the ceramic ring 64 and the corresponding merlons 58. With respect to the lower wedges 70, 72, the shape of the lower wedges may be determined by the surfaces engaging it so that it provides some lower engagement and maneuverability for the ceramic rings 64. The lower 70, 72 and upper 74, 76 wedges may engage one another and may also accommodate one another in their surface engagements.

The upper wedge rings 74, 76 may have projections or extensions into which and around which the merlons 58 may fold. This provides better engagement by the merlons 58 of the upper wedge rings 74, 76, as well as creating a spring effect for some resiliency for the merlons 58 themselves, as well as in conjunction with the upper and lower wedge rings 74, 76.

For the embodiments shown in FIGS. 2 and 3, the inner steel tube 52 is inserted into the ceramic rings 64. The parapets 54, 56, particularly the merlons 58 would be cold worked to capture the ceramic rings 64 via the wedges 70, 72, 74, 76. The wedges are used to allow the ceramic rings 64 to "ride-up" when the assembly 50 is cold. When the assembly 50 cools down, each of the components shrinks. Yet due to the different materials used in construction of each of the elements in the inner raceway assembly 50, they will each contract to a different extent. As the assembly 50 thermally expands, the parts expand and the gap between the inner steel tube 52 and the ceramic ring 64 diminishes.

The inner steel tube 52 does not require precision machining, but such precision machine may be needed for the inner ceramic raceway ring 64 and the wedges 70, 72, 74, 76. The merlons 58 are brazed to the upper wedges 74, 76. The ceramic rings 64 may also be brazed to the upper wedges 74, 76. However, no brazing may be needed for the lower wedges 70, 72, either to the merlons 58 or the inner ceramic raceway ring 64. By careful design, the embodiments shown in FIGS. 2 and 3 might provide retrofitting of this embodiment to existing circumstances and working environments.

Figure 4:
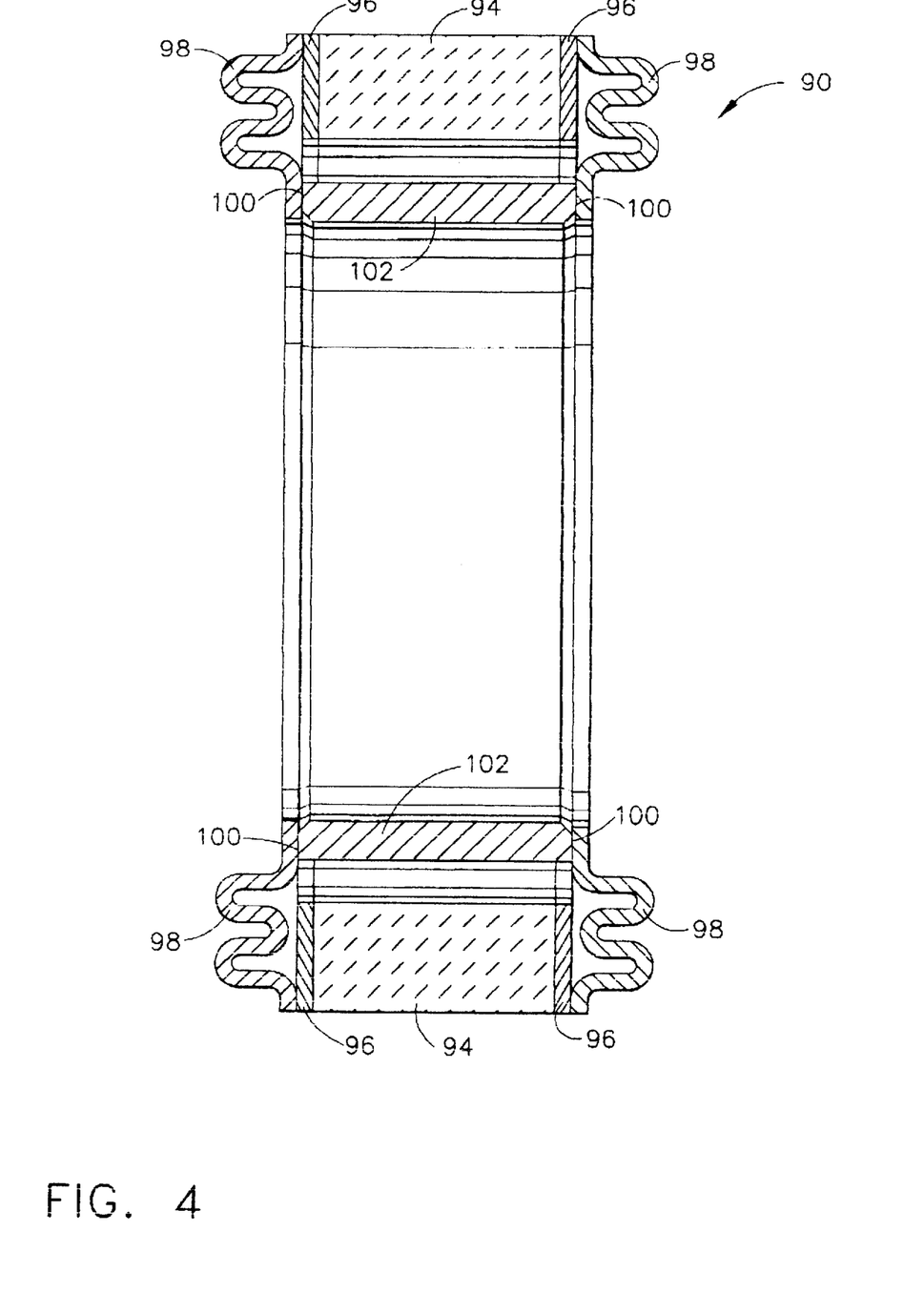
FIG. 4 is a side cross-sectional view of an alternative embodiment of the present invention showing an inner ceramic raceway coupled to a steel ring via expandable and contractable bellows.

The inner ceramic raceway assembly 90 shown in FIG. 4 has a generally circular ceramic raceway ring 94 brazed by braze joints 96 to a flexible bellows-like structure 98. The opposite end of the bellows-like structure 98 is likewise brazed or joined by a brazed joint 100 to an inner steel ring 102.

Tie-tabs, washers, or the like, may substitute for the bellows-like structure 98. The bellows-like structure 98 serves to provide generally uniform separation of the ceramic raceway ring 94 from the inner steel ring 102.

The concentricity of the two rings 94, 102 may be provided by springs, elastomeric filling, a rotating expansion cam mechanism (such as that shown in FIGS. 5 & 6), or the like. Movement along the common shared axis of the two concentric tubes 94, 102 may be provided by the stiffness of the bellows-like structure, tie-tabs, etc. 98. The is bellows-like or other attachment 98 between the inner ceramic raceway ring 94 and the inner steel tube 102 is free to expand and contract by means of integral springs (such as those lending the bellows-like shape), pin-in-tube arrangements, rod-in-loop arrangements (FIG. 5), or the like. The bellows-like structure 98 may be made of sufficiently stiff yet sufficiently resilient material able to undergo the stresses of the environment in which the inner ceramic raceway 90 of FIG. 4 operates.

In this configuration, no precision machining of parts may be required. The sides of the ceramic raceway ring 94 may be metalized by brazing to allow spot-welding, brazing, soldering, tapping, and the like to enable attachment of an axial-motion restraint such as the bellows-like structure 98 shown in FIG. 4. If brazing or soldering is used to attach an axial-restraint system such as the bellows-like structure 98 shown in FIG. 4, an alloy with a lower melting temperature than that used to metalize the ceramic should be used for the brazing or soldering material. This prevents the melting of the metalization layer and promotes the attachment of the axial restraint system 98 to the inner ceramic raceway 94.

Figure 6:
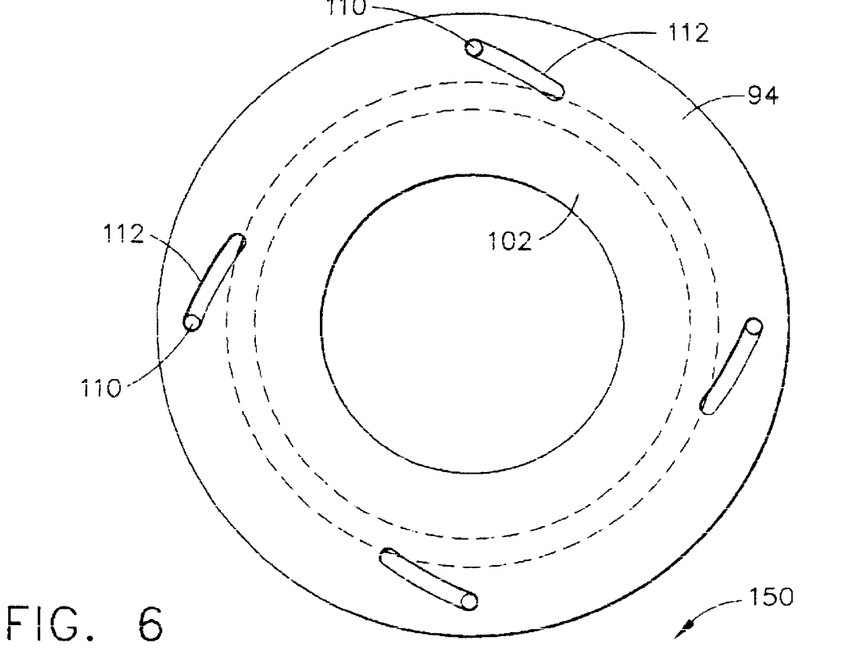
FIG. 6 shows a schematic view of a coaxial and concentric steel ring and ceramic raceway pair disposed with respect to one another via iris-like articulation.

As shown in FIG. 6, if a rotating expansion cam system is used, pegs, rods, bars, or the like 110 may be attached to the inner surface of the ceramic raceway ring 94. Projecting arms of metal or other substances 112 may be used to entrap the pegs 110 between them. The projecting arms allow the inner steel ring 102 to turn with respect to the inner ceramic raceway ring 94. The projecting arms 112 also serve to keep the two rings 92, 102 coaxial and aligned. As the inner steel ring 102 will expand more when heated, the swelling of the inner steel ring 102 serves to push the projecting arms outward. As the travel of the arms is restricted by the pegs 110, the inner steel ring is kept in coaxial alignment with the ceramic raceway ring 94.

Figure 5:
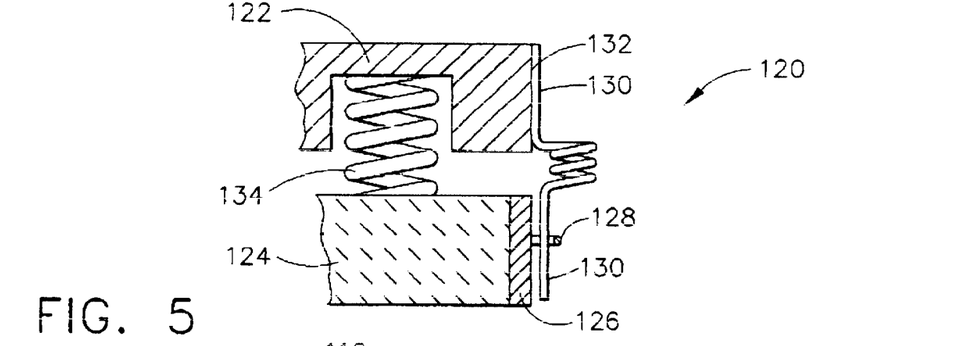
FIG. 5 is a partial cross-sectional view of an inner ceramic raceway coupled to a steel ring by rod-like structures and a spring.

FIG. 5 shows an alternative embodiment of the inner raceway assembly. The inner raceway assembly 120 of FIG. 5 maintains the use of the steel tube or ring 122 with respect to the inner ceramic raceway ring 124. The side of the inner steel ring 122 opposite that of the inner ceramic raceway 124 would be that placed against a drive shaft or the like. Braze joints 126 are used to secure the inner ceramic raceway 124 to loops 128. Traveling through these loops are rods 130, which are brazed to the inner steel ring 122 by brazed joints 132.

While radial displacement of the inner ceramic raceway ring 124 is limited with respect to the inner seal ring 122 due to the entire bearing assembly, the rods 130 and loops 128 serve to ensure there is no axial movement or movement along the shared central axis, between the inner steel ring 122 and the inner ceramic raceway 124. This limits the movement of the inner ceramic raceway ring 124 to motion parallel that to the rods 130. In order to keep the inner ceramic raceway ring 124 disposed away from the inner steel ring 122, springs or the like 134 may be used to urge the inner ceramic raceway ring 124 away from the inner steel ring 122.

Figure 7:
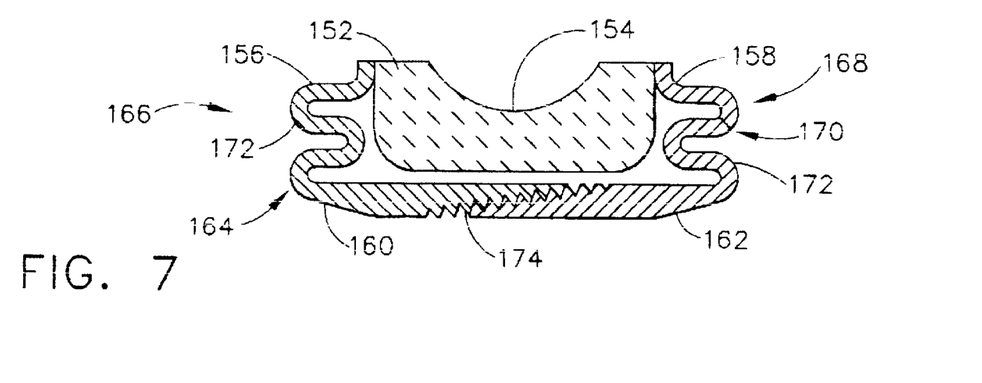
FIG. 7 is a partial cross-sectional view of an inner ceramic raceway coupled to an inner steel ring having inwardly-folded side projections.
Figure 8:
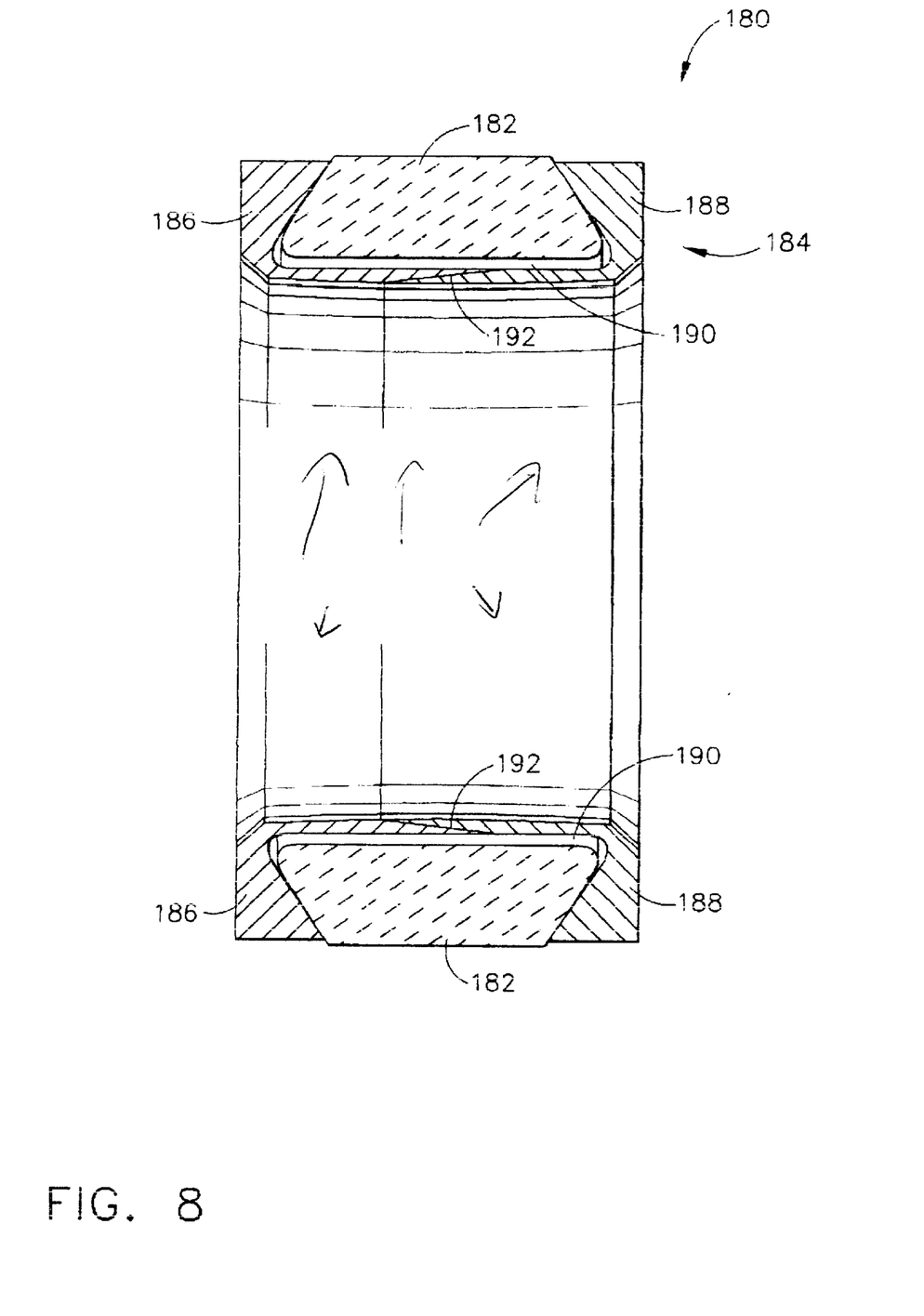
FIG. 8 is cross-sectional view of an inner ceramic raceway constructed in a manner similar to that shown in FIG. 7.

As shown in FIGS. 7 and 8, an alternative embodiment of the inner ceramic raceway may be achieved by using an alternative inner ceramic raceway assembly 150. In this alternative embodiment of the inner ceramic raceway assembly 150, an inner ceramic raceway ring 152 defines a gutter or depression 154. Rolling elements, including balls, needles, cylinders, and the like, may travel through the gutter 154 when engaged by the outer ceramic raceway ring (not shown). Arms 156, 158 may project upwardly from underlying portions 160, 162 as part of an inner steel ring assembly 164. The inner steel ring assembly 164 has a left part portion 166 (as viewed in FIG. 7) and a right part portion 168. The left and right part portions 166,168 thread or screw together by means of threaded engagement 174 in order to engage the inner ceramic raceway 152. The arms 156, 158 may be brazed or otherwise attached to the inner ceramic raceway 152. A gap may or may not be present between the lower portions 160, 162 of the inner steel ring assembly 164 and the bottom of the inner ceramic raceway ring 152.

In order to achieve the convolutions 172 of the left and right arms 156, 158, scores such as that shown at 170 are used in order to make the metal more easily bent or castellations as shown on 58 of FIG. 3.

FIG. 8 shows a side cross-sectional view of an alternative embodiment of the assembly shown in FIG. 7. Instead of convoluted arms, the inner raceway assembly 180 shown in FIG. 8 has a generally trapezoidal ceramic inner raceway 182 entrapped by the inner steel ring assembly 184. The inner steel ring assembly 184 has left and right steel ring portions 186, 188.

As shown in FIG. 8, the left and right steel ring portions extend inwardly to engage the sides of the trapezoidal inner ceramic raceway 182. As the inner ceramic raceway 182 flares outwardly towards the center axis of the assembly 180, the complementary narrowing provided by the left and right steel ring portions 186, 188 serve to entrap the inner ceramic raceway 182 within the confines defined by the left and right steel ring portions 186, 188. This allows for some, minor relative movement between the steel ring assembly 184 and the ceramic raceway 182. A radial gap 190 between the two is shown in FIG. 8 and allows for expansion of both the steel ring assembly 184 and, to a lesser extent, the inner ceramic raceway 182. The left and right steel ring portions 186, 188 are connected or coupled together by means of threading 192 or threaded engagement such as 174 of FIG. 5. The assembly process mates the parts at room temperature and then heats the assembly. A controlled torque is then applied to pull the assembly together axially. This places the ceramic ring in compression due to the conical interface. During the heating stage, the inner ceramic raceway 182 can be brazed to the left and right steel portions 186, 188 at their conical interface. The conical interface can be optimized to have low stiffness at the thin sections of the ceramic to prevent over stressing the ceramic ring by controlling the wall thickness in the axial plane. As the assembly is then cooled to room temperature the low expansion rate ceramic is placed in axial and radial compression. The left and right steel portions 186, 188 can be castellated and/or have a bellows construction at the inner steel ring assembly 184 corner to isolate the bulk of the steel rings from the ID (inner diameter) press fit mount interface at the ID of the left and right steel portions 186, 188.

The devices described above provide industrial applicability by providing one or more of the following benefits or uses. In particular, a better bearing may be provided for operation in mechanically hostile environments, including a 100% ceramic contact surface bearing for such environments. The ceramic ball bearing has 100% ceramic contact surfaces may also be used in other, possibly mechanically and/or environmentally milder environments. The ceramic ball bearing assembly prevents tension, particularly destructive tension, from being applied to ceramic components of a ceramic ball bearing assembly. The ceramic ball bearing assembly can be subject to heating and cool down without suffering destructive tension upon the ceramic portions thereof. The ceramic ball bearing assembly holds the ceramic raceway components in compression by attached steel components and the ceramic ball bearing assembly maintains residual compression upon the ceramic raceway components by attached metal components or the like.

While the present invention has been described with reference to a preferred embodiment or to particular embodiments, it will be understood that various changes and additional variations may be made and equivalents may be substituted for elements thereof without departing from the scope of the invention or the inventive concept thereof. In addition, many modifications may be made to adapt a particular situation or material to the teachings of the invention without departing from the essential scope thereof. Therefore, it is intended that the invention not be limited to particular embodiments disclosed herein for carrying it out, but that the invention includes all embodiments falling within the scope of the appended claims.

What is claimed is:

1. A raceway for a rolling bearing, comprising:
   a castellated tube (52) having a first number of merlons (58) at a first end, including a first merlon;
   a ceramic raceway (64), the ceramic raceway circumscribing the castellated tube (52);
   the first merlon (58) outwardly wrapped to engage the ceramic raceway (64);
   the wrapped merlon (58) acting to restrain the ceramic raceway (64) adjacent the castellated tube (52); whereby
   the ceramic raceway (64) is supported and generally held by the first merlon (58), the ceramic raceway (64) generally not subject to tensile stresses.

2. A raceway for a rolling bearing as set forth in claim 1, further comprising:
   the castellated tube (52) having a second number of merlons (58) at a second end, including a second merlon (58), the second merlon (58) generally oppositely opposed to the first merlon (58) across the castellated tube (52); and
   the second merlon (58) outwardly wrapped to engage the ceramic raceway (64) in general opposition with the first merlon (58); whereby
   the ceramic raceway (64) is captured between the first and second merlons (58).

3. A raceway for a rolling bearing as set forth in claim 1, further comprising:
   a first wedge (74), the first wedge (74) trapped between the first merlon (58) and the ceramic raceway (64); and
   the first wedge (74) expanding when heated thereby overlapping and urging the ceramic raceway (64) toward the castellated tube ends and placing the ceramic inner ring (64) in compression after cooling to room temperature; whereby
   the castellated tube ends may be formed in a forge press and a gap defined between the castellated tube and the ceramic raceway diminishes as the first wedge expands.

4. A raceway for a rolling bearing as set forth in claim 1, further comprising:
   a first support ring (70), the first support ring (70) circumscribing the castellated tube (52) adjacent the ceramic raceway (64);
   the first support ring (70) protecting the ceramic raceway (64) from the first merlon (58) when the first merlon (58) is outwardly wrapped to engage the ceramic raceway (64).

5. A ceramic bearing assembly (50), comprising:
   an outer ceramic raceway held in compression by an outer support;
   an inner ceramic raceway (64);
   a ceramic rolling element trapped between the outer ceramic raceway and the inner ceramic raceway (64), the ceramic rolling element rotating when angular translation occurs between the first outer ceramic raceway and the second inner ceramic raceway (64), the ceramic rolling element selected from the group consisting of balls, needles, and rollers;
   a castellated tube (52) having a first number of merlons (58) at a first end (54), including a first merlon (58), the inner ceramic raceway (64) circumscribing the castellated tube (52);

the first merlon (58) outwardly wrapped to engage the inner ceramic raceway (64);

the wrapped merlon (58) acting to restrain the inner ceramic raceway (64) adjacent the castellated tube (52);

the castellated tube (52) having a second number of merlons (58) at a second end (56), including a second merlon (58), the second merlon (58) generally oppositely opposed to the first merlon (58) across the castellated tube (52);

the second merlon (58) outwardly wrapped to engage the inner ceramic raceway (64) in general opposition with the first merlon (58);

the inner ceramic raceway (64) captured between the first and second merlons;

a first wedge (74), the first wedge (74) between the first merlon (58) and the inner ceramic raceway (64);

the first wedge (74) expanding when heated and overlapping the ceramic raceway (64) and placing the ceramic inner ring (64) in compression after cooling to room temperature such that a gap defined between the castellated tube (52) and the inner ceramic raceway (64) diminishes as the first wedge (74) expands, the castellated tube (52) formable in a forge press;

a first support ring (70), the first support ring (70) circumscribing the castellated tube (52) adjacent the inner ceramic raceway (64); and the first support ring (70) protecting the inner ceramic raceway (64) from the first merlon (58) when the first merlon (58) is outwardly wrapped to engage the inner ceramic raceway (64); whereby the inner ceramic raceway (64) is supported and generally held by the first merlon (58), the inner ceramic raceway (64) generally not subject to tensile stresses.

* * * * *